US011318656B2

(12) United States Patent
Shiokawa et al.

(10) Patent No.: US 11,318,656 B2
(45) Date of Patent: May 3, 2022

(54) LIQUID BLOW MOLDING METHOD

(71) Applicant: YOSHINO KOGYOSHO CO., LTD., Tokyo (JP)

(72) Inventors: Mitsuru Shiokawa, Tokyo (JP); Yuichi Okuyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 59 days.

(21) Appl. No.: 16/761,624

(22) PCT Filed: Oct. 3, 2018

(86) PCT No.: PCT/JP2018/037101
§ 371 (c)(1),
(2) Date: May 5, 2020

(87) PCT Pub. No.: WO2019/102721
PCT Pub. Date: May 31, 2019

(65) Prior Publication Data
US 2021/0178651 A1      Jun. 17, 2021

(30) Foreign Application Priority Data

Nov. 27, 2017  (JP) .............................. JP2017-227111

(51) Int. Cl.
*B29C 49/46*       (2006.01)
*B29C 49/12*       (2006.01)
(Continued)

(52) U.S. Cl.
CPC .............. *B29C 49/46* (2013.01); *B29C 49/12* (2013.01); *B29C 2049/4664* (2013.01);
(Continued)

(58) Field of Classification Search
CPC . B29C 49/46; B29C 49/12; B29C 2049/4664; B29K 2023/06; B29K 2023/12; B29K 2067/003; B29L 2031/7158
See application file for complete search history.

(56) References Cited

U.S. PATENT DOCUMENTS 4,871,507 A * 10/1989 Ajmera ............... B29C 49/4823
264/521
11,014,281 B2 *  5/2021 Suzuki ................ B29C 49/4215

FOREIGN PATENT DOCUMENTS

JP       2006-520709 A       9/2006
JP       2013-208834 A      10/2013
(Continued)

OTHER PUBLICATIONS

Dec. 18, 2018 International Search Report issued in International Patent Application No. PCT/JP2018/037101.
(Continued)

*Primary Examiner* — Jeffrey M Wollschlager
*Assistant Examiner* — Shibin Liang
(74) *Attorney, Agent, or Firm* — Oliff PLC (57) ABSTRACT

A liquid blow molding method of molding a liquid container containing a content liquid from a preform, includes a nozzle engagement step of engaging a blow nozzle with a mouth portion of the preform; a molding step of molding the preform into a container of a predetermined shape by supplying a pressurized liquid into the preform; a suck-back step of sucking back a predetermined amount of liquid from the inside of the container to a supply channel by operating a pump in a reverse direction with the container put in the upside-down posture while the blow nozzle is engaged with the mouth portion; and a nozzle separation step of separating the blow nozzle from the mouth portion with the container put in the upright posture.

18 Claims, 9 Drawing Sheets

(51) Int. Cl.
  *B29K 23/00* (2006.01)
  *B29K 67/00* (2006.01)
  *B29L 31/00* (2006.01)

(52) U.S. Cl.
  CPC ...... *B29K 2023/06* (2013.01); *B29K 2023/12* (2013.01); *B29K 2067/003* (2013.01); *B29L 2031/7158* (2013.01)

(56) References Cited

FOREIGN PATENT DOCUMENTS

| | | |
|---|---|---|
| JP | 2014-069441 A | 4/2014 |
| JP | 2017-065738 A | 4/2017 |
| JP | 2017-177750 A | 10/2017 |
| TW | M315603 U | 7/2007 |
| WO | 2016/066276 A1 | 5/2016 |
| WO | 2017/090340 A1 | 6/2017 |
| WO | 2017/187698 A1 | 11/2017 |
| WO | 2017187698 * 11/2017 ............. B29C 49/46 |

OTHER PUBLICATIONS

Aug. 17, 2021 Office Action issued in Chinese Patent Application No. 201880075255.0.

* cited by examiner

LIQUID BLOW MOLDING METHOD

TECHNICAL FIELD

The present disclosure relates to a liquid blow molding method of molding a synthetic resin preform into a liquid container containing a content liquid.

BACKGROUND

Synthetic resin containers, representative examples of which including polypropylene (PP) bottles and polyethylene terephthalate (PET) bottles, are used to contain, as content liquids, various liquids such as beverages, cosmetics, medicines, detergents and toiletries such as shampoos. Such containers are generally manufactured by blow molding a preform formed of a thermoplastic synthetic resin material described above into a bottomed tubular shape, for example.

As a blow molding for molding a preform into a container, a liquid blow molding is known, in which, as a pressure medium supplied into a preform, a pressurized liquid is used instead of the pressurized air.

For example, Patent Literatures 1 and 2 (PTL 1 and PTL 2) disclose a liquid blow molding method in which a preform heated in advance to a temperature at which a stretchability is achieved is placed in a mold for blow molding, the preform is stretched by a stretching rod in the longitudinal direction while a liquid pressurized to a predetermined pressure is supplied into the preform through a blow nozzle. In this manner the preform is molded into a container of a predetermined shape conforming to a cavity of the mold. According to the above described liquid blow molding method, as a liquid supplied into a preform, a content liquid such as beverage contained finally as a product in a container is used, and molding of a container and filling of a content liquid into the container are performed at the same time, thus a liquid container containing a content liquid can be molded (manufactured) easily. In this manner, a step of filling a content liquid into a container after molding is omitted, and as a result, a configuration of its production process and production line (apparatus) can be simplified.

CITATION LIST

Patent Literature

PTL 1: JP2013-208834 (A)
PTL 2: JP2014-069441 (A)

SUMMARY

Technical Problem

In the above described existing liquid blow molding method, in order to provide a predetermined amount of headspace (a space not filled with liquid) in a container after molding, after the liquid blow molding, a stretching rod is pulled out from the container with a blow nozzle closed with a seal body to produce a headspace corresponding to a volume of the stretching rod in the container (PTL 1).

Further, a method of providing a predetermined amount of headspace in a container is considered, in which, after the liquid blow molding, "suck-back" is performed in which a plunger pump is operated in the reverse direction to suck back a predetermined amount of liquid from the inside of the container after molding toward a supply channel (PTL 2).

Moreover, when a large headspace is needed to be provided inside a container such as a container with a pump configured to contain shampoo or the like as a content liquid, a method of pulling the above described stretching rod out from a container and a suck back method are used together, and as a result a headspace of a required size can be formed inside the container.

However, in the liquid blow molding, a liquid is supplied into a preform while entraining the air present in the preform. Thus, when the above described suck back is performed after the liquid blow molding, a liquid containing a lot of air bubbles is taken into the supply channel. Therefore, in the next liquid blow molding, a liquid containing a lot of air bubbles is supplied from the supply channel toward inside of the preform, which makes the amount and the pressure of the liquid filled into the container after molding unstable, and a decline in moldability of the container may occur.

The present disclosure has been conceived in view of the above described problem, and it is an object of the present disclosure to provide a liquid blow molding method in which a liquid container having therein a headspace can be precisely molded by repeating the liquid blow molding.

Solution to Problem

The disclosed liquid blow molding method is a liquid blow molding method of molding a liquid container containing a content liquid from a synthetic resin preform, the method including: a nozzle engagement step of engaging a blow nozzle connected to a pump through a supply channel with a mouth portion of the preform; a molding step of molding the preform into a container of a predetermined shape by supplying a pressurized liquid from the pump into the preform through the supply channel and the blow nozzle; a suck-back step of sucking back a predetermined amount of liquid from the inside of the container to the supply channel by operating the pump in the reverse direction with the container molded in the molding step put in the upside-down posture while the blow nozzle is engaged with the mouth portion; and a nozzle separation step of separating the blow nozzle from the mouth portion with the container put in the upright posture, after the suck-back step.

In the disclosed liquid blow molding method configured in the above described manner, preferably, the nozzle separation step is performed by putting the container in the upright posture after the blow nozzle is closed by a seal body in a state where a predetermined amount of liquid is sucked back from the inside of the container to the supply channel in the suck-back step.

In the disclosed liquid blow molding method configured in the above described manner, preferably, the stretching rod is pulled out from the container after the preform is stretched axially by a stretching rod in the molding step and the blow nozzle is closed by the seal body in the nozzle separation step.

In the disclosed liquid blow molding method configured in the above described manner, preferably, before the molding step, an air-liquid replacement step is performed, in which the air in the preform is replaced with a liquid by supplying a liquid into the preform at a pressure of a degree that does not blow mold the preform.

In the disclosed liquid blow molding method configured in the above described manner, preferably, the air-liquid replacement step is performed by putting the preform in the upright posture.

In the disclosed liquid blow molding method configured in the above described manner, preferably, the container in the upside-down posture is molded by performing the molding step with the preform put in the upside-down posture, and after the molding step, the suck-back step is performed with the container kept in the upside-down posture.

Advantageous Effect

According to the present disclosure, a liquid blow molding method capable of molding precisely a liquid container having therein a headspace by repeating the liquid blow molding can be provided.

DETAILED DESCRIPTION

The present disclosure will be described in more detail below with reference to the drawings.

The disclosed liquid blow molding method is a liquid blow molding method of molding a liquid container containing a content liquid from a synthetic resin preform The method includes: a nozzle engagement step of engaging a blow nozzle connected to a pump through a supply channel with a mouth portion of the preform; a molding step of molding the preform into a container of a predetermined shape by supplying a pressurized liquid from the pump into the preform through the supply channel and the blow nozzle; a suck-back step of sucking back a predetermined amount of liquid from the inside of the container to the supply channel by operating the pump in the reverse direction with the container molded in the molding step put in the upside-down posture; and a nozzle separation step of separating the blow nozzle from the mouth portion with the container put in the upright posture, after the suck-back step. The disclosed liquid blow molding method described above can be said as a method of manufacturing a liquid container in which a liquid container containing a content liquid is manufactured from a preform.

Figure 1:
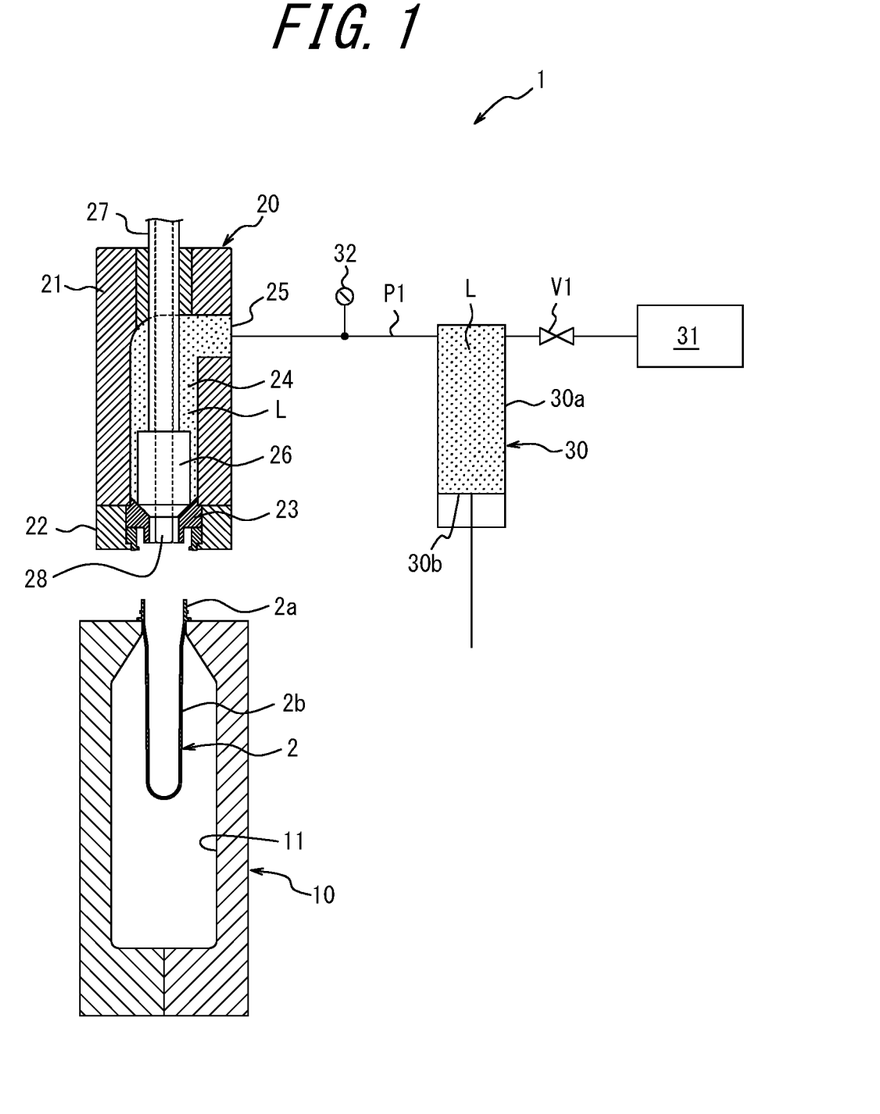
FIG. 1 is a diagram illustrating an example of a liquid blow molding apparatus used for a liquid blow molding method according to an embodiment of the present disclosure.

The disclosed liquid blow molding method can be performed by using a liquid blow molding apparatus 1 configured as illustrated in FIG. 1, for example.

The liquid blow molding apparatus 1 illustrated in FIG. 1 liquid blow molds a synthetic resin preform 2 into a liquid container contained therein a content liquid. Here, the liquid blow molding is a blow molding in which, as a pressurized medium (pressurized fluid) supplied to the preform 2, a pressurized liquid is used instead of pressurized air used for the air blow molding.

As a liquid L supplied to the preform 2, that is, a content liquid L contained in a liquid container after molding, a variety of liquids such as, for example, beverages, cosmetics, chemicals, detergents, toiletries such as shampoos, etc., can be used.

As the preform 2, preferably, those formed, by a thermoplastic synthetic resin material such as polypropylene (PP) and polyethylene terephthalate (PET), for example, into a bottomed tubular shape including a cylindrical mouth portion 2a, which is an open end, and a cylindrical body portion 2b continuing to the mouth portion 2a and including a closed lower end are used.

It is to be noted that the shape of the preform 2 is not limited to the above described one, and a preform 2 having a variety of shapes can be used according to the shape, etc., of the container after molding.

Although not illustrated in detail, on the outer wall surface of the mouth portion 2a of the preform 2 is provided with an engaging protrusion configured to mount a plug cap (not illustrated) to the mouth portion 2a of the liquid container after molding by plugging (undercut engagement). It is to be noted that, instead of the engaging protrusion, a male thread may be provided to the outer wall surface of the mouth portion 2a so as to mount a plug cap to the mouth portion 2a through thread connection.

The liquid blow molding apparatus 1 has a mold 10 for blow molding. The mold 10 has a cavity 11 having a shape corresponding to a final shape of a container, such as a bottle shape, for example. The cavity 11 opens upward on the upper surface of the mold 10. The preform 2 is placed in the mold 10 with the body portion 2b disposed inside the cavity 11 of the mold 10 and with the mouth portion 2a protruded upward from the mold 10.

Although not illustrated in detail, the mold 10 can be opened right and left, and after the preform 2 is molded into a liquid container, the liquid container can be ejected from the mold 10 by opening the mold 10 right and left.

Above the mold 10 is provided with a nozzle unit 20 configured to supply a liquid L into the preform 2. The nozzle unit 20 has a main body block 21, and the main body block 21 is vertically displaceable relative to the mold 10. The lower end of the main body block 21 is provided with a support block 22, and a blow nozzle 23 is mounted to the lower end of the main body block 21 by being supported by the support block 22. The blow nozzle 23 is formed into a substantially cylindrical shape, and when the nozzle unit 20 is displaced relative to the mold 10 to a stroke end in a direction approaching the mold 10, the blow nozzle 23 is engaged, from above, with the mouth portion 2a of the preform 2 placed in the mold 10.

Inside the main body block 21 is provided with a supply channel 24 that extends in the vertical direction. The supply channel 24 is a flow channel configured to supply a liquid L to the blow nozzle 23, and communicates with the blow nozzle 23 at the lower end thereof. Further, the main body block 21 is provided with a supply port 25 that communicates with the upper end of the supply channel 24.

Inside the supply channel 24 is provided with a seal body 26 configured to open/close the blow nozzle 23. The seal body 26 is fixed to the lower end of a shaft body 27 provided vertically displaceable relative to the nozzle unit 20, and is vertically displaceable inside the supply channel 24. The seal body 26 is formed into a columnar shape. When the seal body 26 is displaced to the close position, which is a stroke end position on the lower side, it comes in contact with the upper surface of the blow nozzle 23 on the lower end surface thereof and closes the blow nozzle 23. On the other hand, when the seal body 26 is displaced upward from the close position, the blow nozzle 23 is opened and communicated with the supply channel 24.

As illustrated, the liquid blow molding apparatus 1 may include a stretching rod 28. The stretching rod 28 is inserted into a shaft center of the shaft body 27 to be vertically displaceable relative to the shaft body 27, and is provided to be extendable and retractable from the lower end of the seal body 26 through the shaft center of the seal body 26. The stretching rod 28 is driven by a driving source not illustrated and is displaced downward, thus can stretch the preform 2 axially. In this manner, when the stretching rod 28 is provided, the liquid blow molding apparatus 1 can perform a biaxial stretch blow molding in which the preform 2 is stretched axially by the stretching rod 28 and is stretched radially by a pressurized liquid L supplied from the mouth portion 2a.

It is to be noted that the liquid blow molding apparatus 1 may not include the stretching rod 28, and may be configured to liquid blow mold the preform 2 by using the pressurized liquid L only.

A pump 30 is connected to the supply port 25 through a pipe P1. The pump 30 can be configured as a plunger pump including a cylinder 30a and a piston 30b, for example.

A supply tank 31 is connected to the pump 30. The supply tank 31 can be configured to store a liquid L and to heat the liquid L up to a predetermined temperature and hold the liquid L at the temperature. A flow channel between the pump 30 and the supply tank 31 is provided with an opening-closing valve V1, and the flow channel can be opened/closed by the opening-closing valve V1. It is to be noted that the reference sign 32 represents a pressure gauge provided to the pipe P1.

The pump 30 operates in the positive direction (the pressurized direction) with the seal body 26 displaced upward to open the blow nozzle 23 and with the opening-closing valve V1 closed. In this manner, the liquid L pressurized up to a predetermined pressure can be supplied into the preform 2 through the pipe P1, the supply port 25, the supply channel 24 and the blow nozzle 23. Further, the pump 30 is operated in the reverse direction (sucking direction) with the blow nozzle 23 closed by the seal body 26 and with the opening-closing valve V1 open. In this manner, the liquid L stored in the supply tank 31 can be sucked into the pump 30.

In a state where the nozzle unit 20 is relatively displaced to the stroke end in the direction approaching the mold 10, the mold 10 and the nozzle unit 20 can be rotated about a rotation axis not illustrated in an integrated manner such that they are put in upside down.

As a rotation mechanism for rotating the mold 10 and the nozzle unit 20 upside down, rotation mechanisms of various configurations may be used. Further, the pipe P1 and other devices connected to the mold 10 and the nozzle unit 20 may be configured appropriately so as to allow the mold 10 and the nozzle unit 20 to be rotatable.

The preform 2 is placed in the mold 10 in the upright posture where the opening of the mouth portion 2a faces upward, and when the mold 10 and the nozzle unit 20 are rotated in an integrated manner so as to be upside down, the preform 2 is put in the upside-down posture where the opening of the mouth portion 2a faces downward.

Here, preferably, when the preform 2 is put in the upright posture, the mouth portion 2a of the preform 2 faces straight up. However, when the preform 2 is put in the upside-down posture, the opening of the mouth portion 2a does not necessarily have to face directly downward, and may face obliquely downward, as long as the mouth portion 2a is located below the body portion 2b.

Operation of the nozzle unit 20, the seal body 26, the stretching rod 35, the pump 30, the opening-closing valve V1, the rotation mechanism and the like are controlled by a controller (not illustrated) in an integrated manner. This control can be performed with reference to the values and the like of the pressure gauge 32. Preferably, the opening-closing valve V1 may be configured as a solenoid valve that can be controlled by a controller.

Next, a method of molding a liquid container C containing a content liquid in a container of a predetermined shape from the synthetic resin preform 2 by using the liquid blow molding apparatus 1 configured in the above described manner (a liquid blow molding method according to the present disclosure) will be described.

First, the synthetic resin preform 2 put in the upright posture is placed in the mold for blow molding 10 and is clamped, the preform 2 having been preheated, by using a heating means (not illustrated) such as a heater, to a predetermined temperature (e.g. from 80° C. to 150° C.) at which a stretchability is achieved. As illustrated in FIG. 1, when the clamping is completed, the preform 2 will be in a state where the mouth portion 2a projects upward from the upper surface of the mold 10 and the body portion 2b is placed inside the cavity 11.

Figure 2:
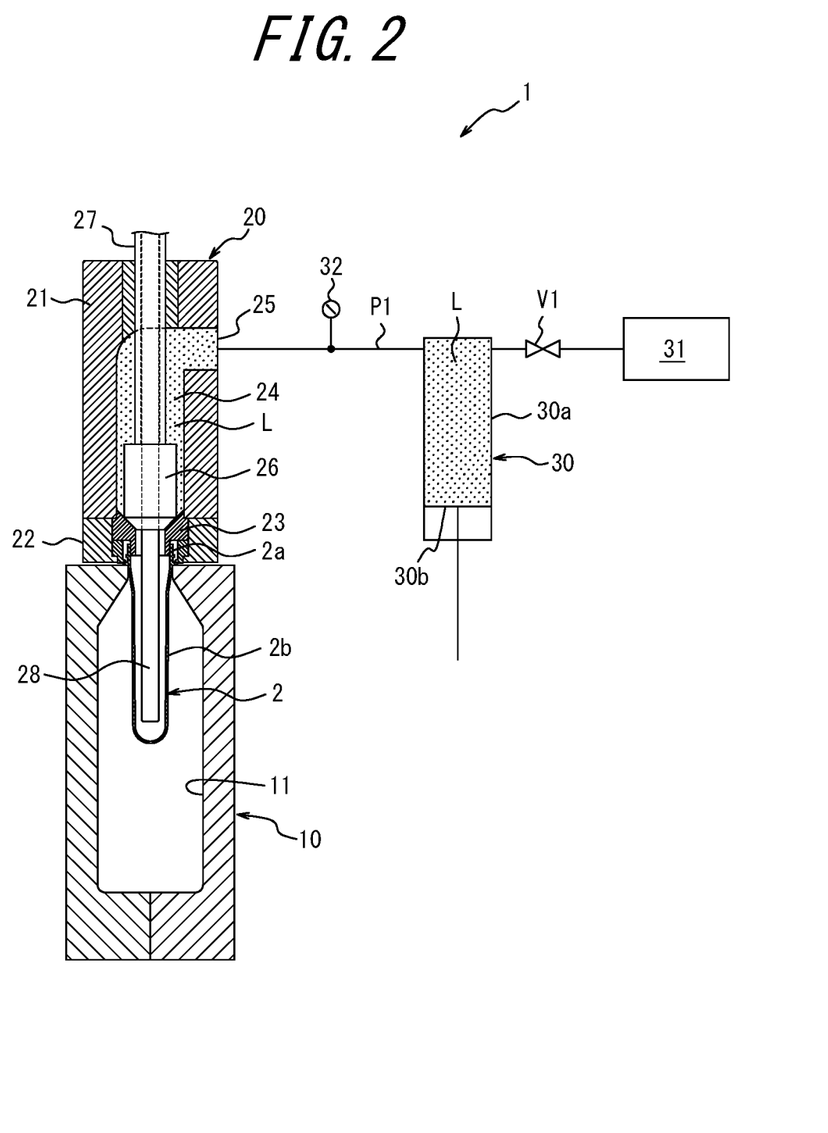
FIG. 2 is a diagram illustrating the liquid blow molding apparatus when a nozzle engagement step is completed.

When the preform 2 is placed in the mold 10, next, the nozzle engagement step is performed. In the nozzle engagement step, the nozzle unit 20 is displaced relatively toward the mold 10 to allow the blow nozzle 23 to be engaged with the mouth portion 2a of the preform 2 in a liquid-tight manner. FIG. 2 illustrates a state where the nozzle engagement step is completed. It is to be noted, in the state where the nozzle engagement step is completed, both of the seal body 26 and the opening-closing valve V1 are closed.

In the nozzle engagement step, the stretching rod 28 may be displaced forward so that the tip thereof is located near the bottom of the body portion 2b of the preform 2.

Figure 3:
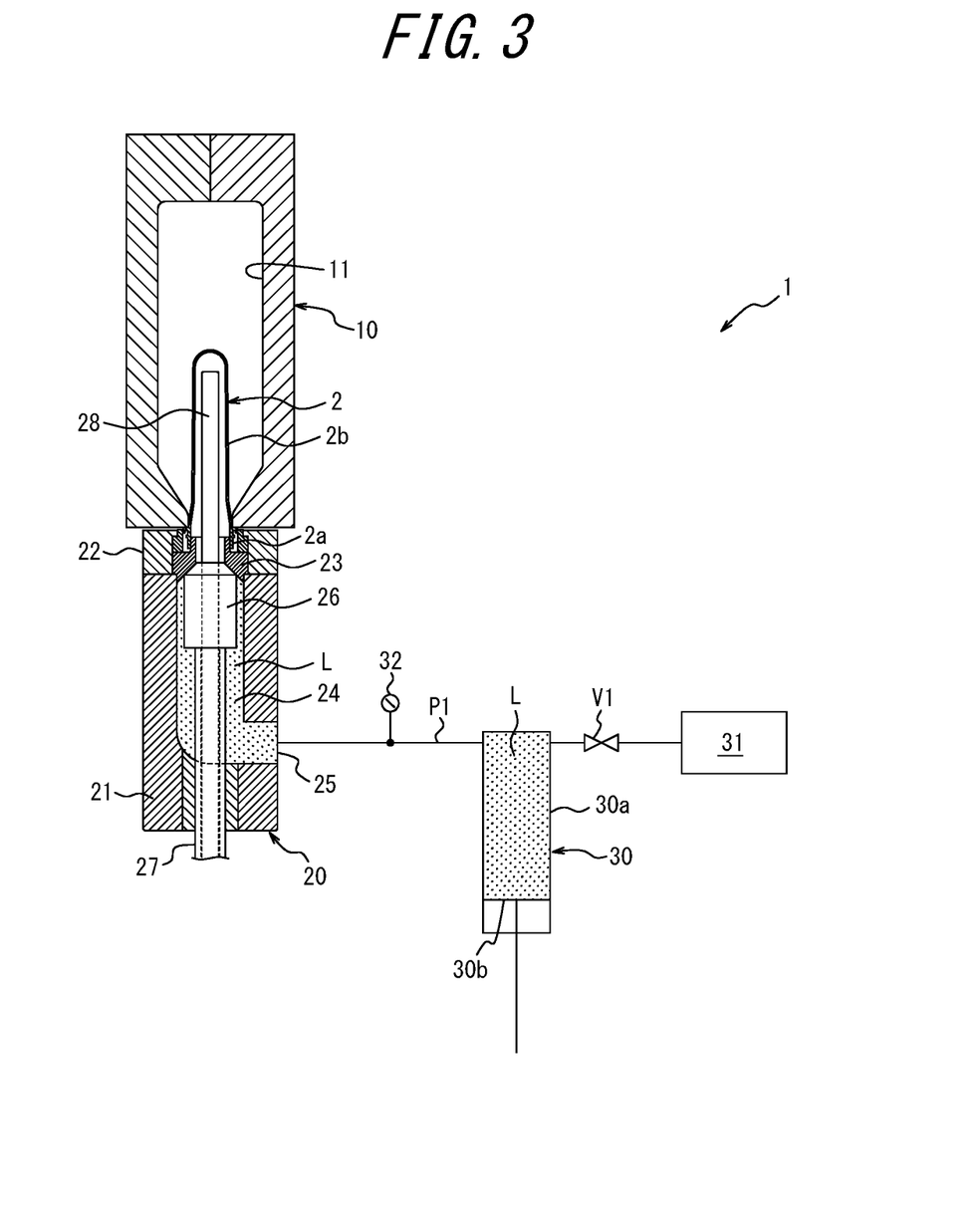
FIG. 3 is a diagram illustrating the liquid blow molding apparatus with a preform put in the upside-down posture.

When the nozzle engagement step is completed, as illustrated in FIG. 3, the mold 10 and the nozzle unit 20 are rotated by a rotation mechanism not illustrated so that they are put in an upside-down posture where the mouth portion 2a of the preform 2 placed in the mold 10 faces directly downward while the blow nozzle 23 is engaged with the mouth portion 2a.

Figure 4:
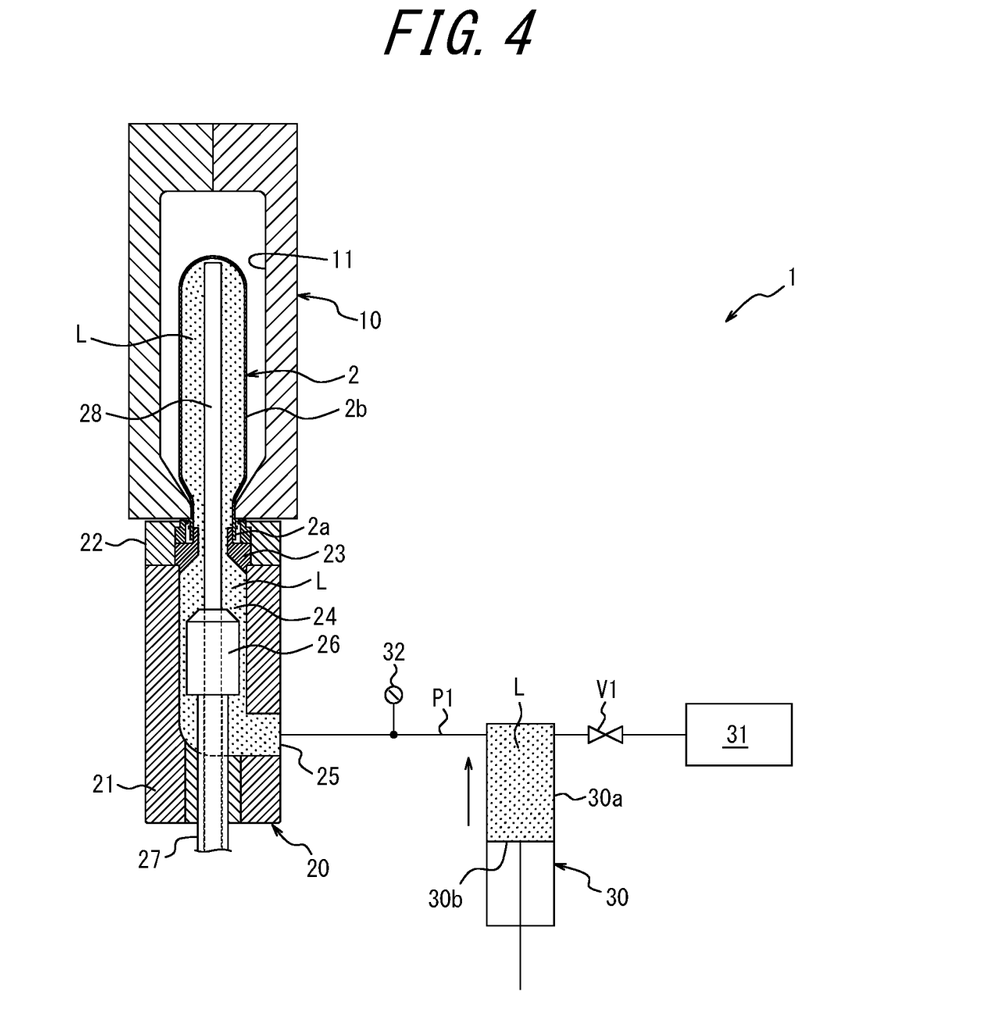
FIG. 4 is a diagram illustrating the liquid blow molding apparatus during a molding step.
Figure 5:
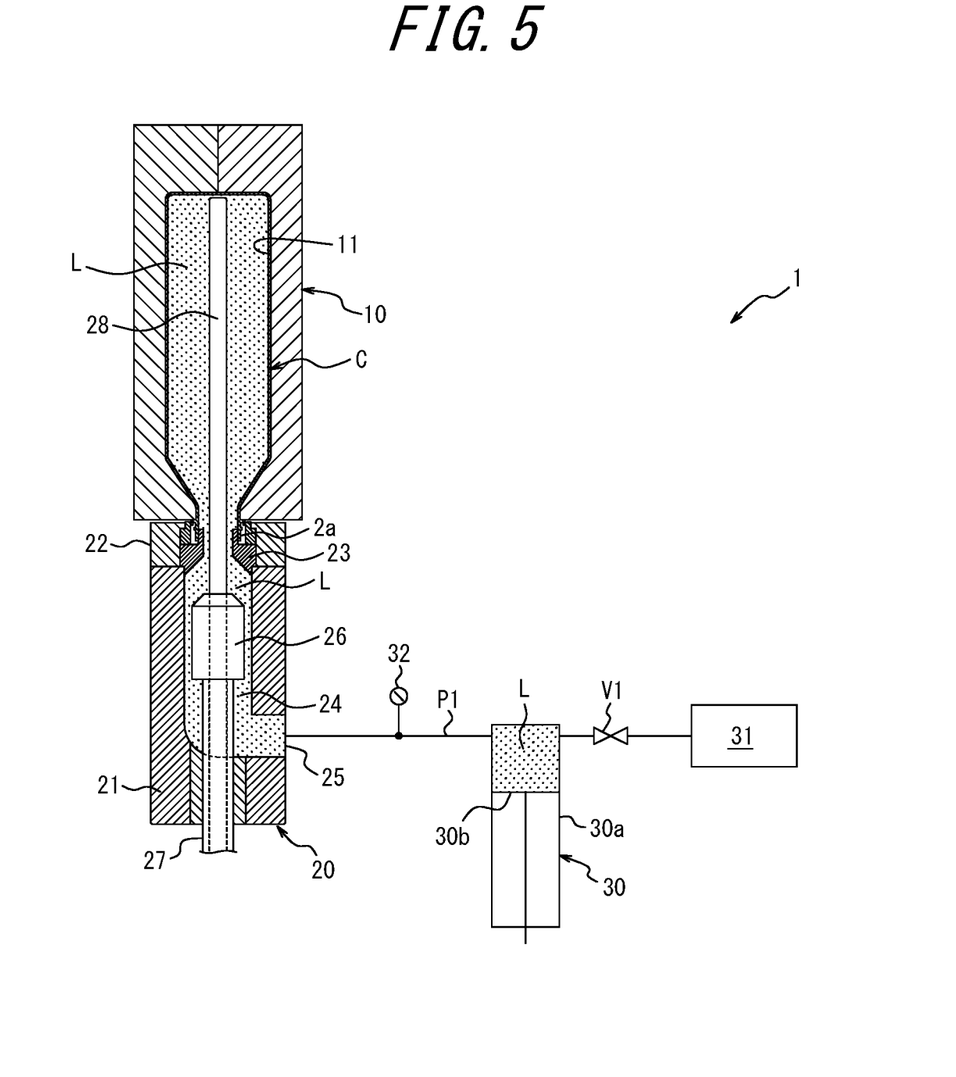
FIG. 5 is a diagram illustrating the liquid blow molding apparatus when the molding step is completed.

Next, the molding step is performed. In the molding step, as illustrated in FIG. 4, the seal body 26 is opened while the opening-closing valve V1 is closed, and in that state the pump 30 is operated in the positive direction (pressurized direction). When the pump 30 is operated in the positive direction, the liquid L pressurized to a predetermined pressure is supplied from the pump 30 into the preform 2 through the supply channel 24 and the blow nozzle 23, and the preform 2 is stretched to an expanded state by the pressure of the liquid L. As illustrated in FIG. 5, when the preform 2 is molded (liquid blow molded) into a liquid container C of a predetermined shape conforming to the cavity 11, operation of the pump 30 is stopped and the molding step is completed. In this manner, in this embodiment, the molding step is performed with the preform 2 put in the upside-down posture, and a liquid container C in the upside-down posture is molded.

When the stretching rod 28 is provided to the liquid blow molding apparatus 1, the stretching rod 28 is displaced forward into the preform 2 in the molding step, and the preform 2 is stretched in the axial (longitudinal) direction by the stretching rod 28. In this manner, a biaxial stretch blow molding in which the preform 2 is biaxially stretched by the pressure of the liquid L and the stretching rod 28 can be performed. According to the biaxial stretch blow molding, the preform 2 can be molded into a liquid container C of a predetermined shape more precisely.

Figure 6:
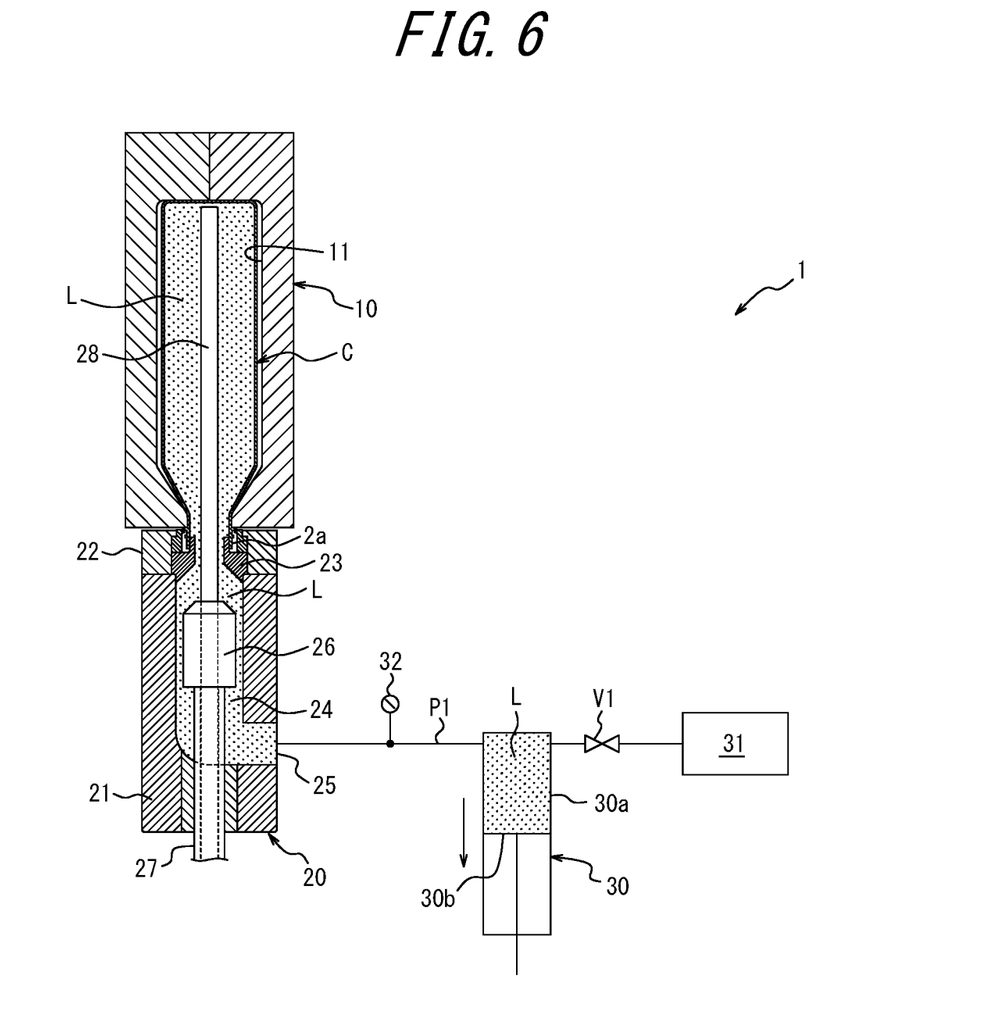
FIG. 6 is a diagram illustrating the liquid blow molding apparatus during a suck-back step.

When the molding step is completed, subsequently the suck-back step is performed. As illustrated in FIG. 6, the suck-back step is performed in a state where a liquid container C molded in the molding step is put in the upside-down posture while the blow nozzle 23 is engaged with the mouth portion 2a.

In the suck-back step, the pump 30 is operated in the reverse direction while the seal body 26 is at an open position to allow the blow nozzle 23 to be kept open, and a predetermined amount of liquid L is sucked back from inside of the liquid container C molded into a predetermined shape in the molding step to the supply channel 24 through the blow nozzle 23. The amount of the liquid L sucked back to the supply channel 24 in the suck-back step is appropriately set such that a head space HS provided in a completed liquid container C has a predetermined amount. When the suck-back step is performed, the content amount of the liquid container C is reduced by the amount of the liquid L sucked back to the supply channel 24. Then, the liquid container C is deformed due to volume reduction, in that state a gap is generated between the container C and the cavity 11, and inside the container C will be in a state of a negative pressure that is lower than the atmospheric pressure.

Here, in the molding step of molding a liquid container C of a predetermined shape by supplying a pressurized liquid L into the preform 2, the liquid L is supplied into the preform 2 while entraining the air present in the preform. Thus, the liquid L inside the liquid container C after molding contains a lot of air bubbles, and when the suck-back step is performed while the liquid container C after molding is kept in the upright posture, the liquid L containing a lot of air bubbles may be taken into the supply channel 24. In particular, when the liquid L is a liquid with a relatively high viscosity such as shampoo or liquid detergent, for example, the liquid L may contain a lot of air bubbles near the mouth portion 2a of the liquid container C. Thus, the liquid L containing a lot of air bubbles is taken into the supply channel 24, then, in the following molding step, the liquid L containing a lot of air bubbles is supplied from the supply channel 24 into the preform 2. As a result the amount and the pressure of the liquid L filled into the liquid container C after molding becomes unstable, and a decline in the moldability of the liquid container C may occur.

On the other hand, in the liquid blow molding method according to this embodiment, the suck-back step is performed in a state where the liquid container C molded in the molding step is put in the upside-down posture. Thus, the air bubbles entrained in the liquid L in the molding step is collected on the bottom side (opposite side of the mouth portion 2a) of the liquid container C to prevent the liquid L present near the mouth portion 2a from containing a lot of air bubbles, and the amount of air bubbles contained in the liquid L sucked back from the inside of the liquid container C to the supply channel 24 in the suck-back step can be reduced. In this manner, a liquid L containing a lot of air bubbles is prevented from being supplied into the preform 2 in the following molding step, and the amount and the pressure of the liquid L filled into a liquid container C after molding is stabilized. As a result the liquid container C can be molded precisely.

Further, in this embodiment, after a liquid container C in the upside-down posture is molded by performing the molding step with the preform 2 put in the upside-down posture, the suck-back step is performed with the liquid container C kept in the upside-down posture. Thus, a lot of air bubbles entrained in the liquid L in the molding step is collected on the bottom side of the liquid container C at the stage of the molding step, and the amount of air bubbles contained in the liquid L near the mouth portion 2a can be further reduced. In this manner, the amount of air bubbles contained in the liquid L sucked backed from the inside of the liquid container C to the supply channel 24 in the suck-back step can be further reduced.

Figure 7:
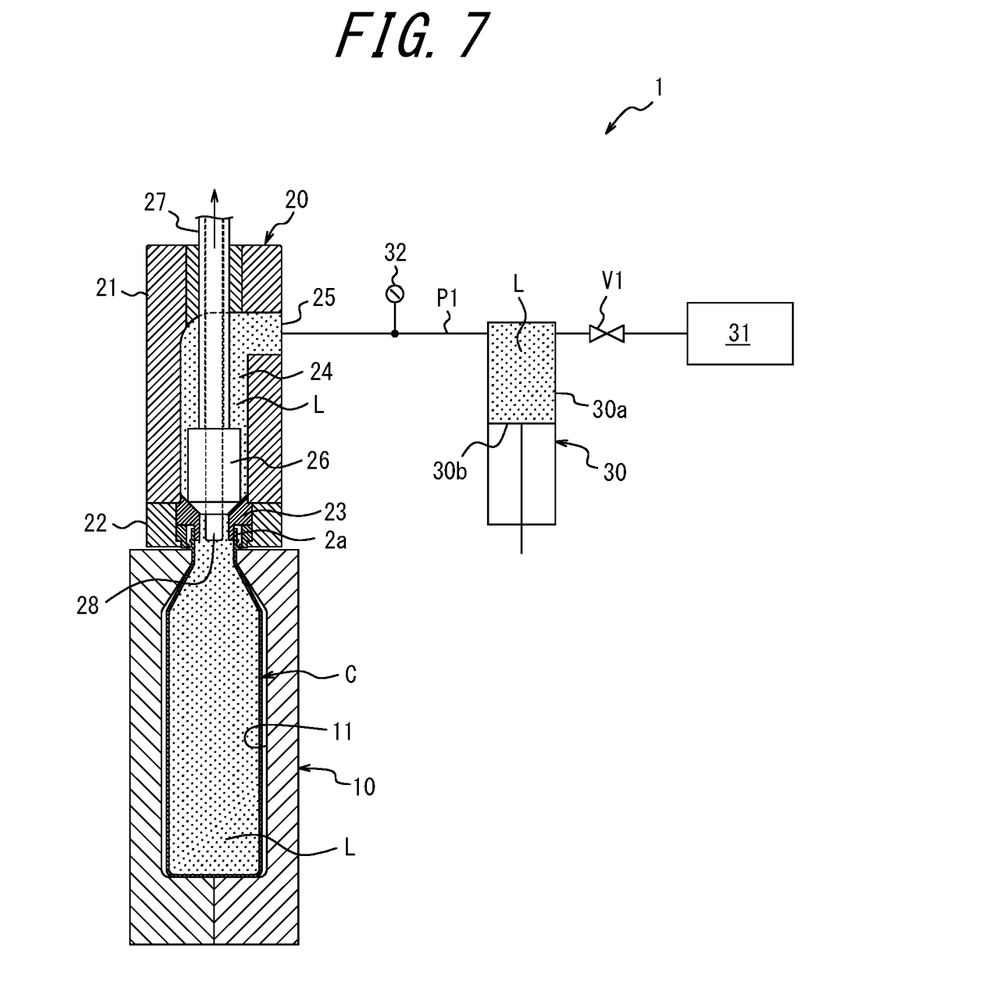
FIG. 7 is a diagram illustrating the liquid blow molding apparatus with a blow nozzle closed by a seal body and with the container put in the upright posture, after the suck-back step.

When the suck-back step is completed, next, the blow nozzle 23 is closed by the seal body 26 in a state where a predetermined amount of liquid L is sucked back from the inside of the liquid container C molded into a predetermined shape to the supply channel 24 in the suck-back step. After that, as illustrated in FIG. 7, the mold 10 and the nozzle unit 20 are rotated upside down by the rotating mechanism not illustrated so that the liquid container C is put in the upright posture where the mouth portion 2a faces directly upward.

It is to be noted that, when the liquid blow molding apparatus 1 is provided with the stretching rod 28, after the blow nozzle 23 is closed by the seal body 26, the stretching rod 28 may be pulled out from the liquid container C. The content amount of the liquid container C can be reduced further by the volume of the stretching rod 28 by pulling the stretching rod 28 out from the liquid container C. In this case, the amount of the liquid L sucked back from the inside of the liquid container C to the supply channel 24 in the suck-back step may be set in consideration of a decrease in the content amount caused by pulling the stretching rod 28 out from the liquid container C.

In this manner, when a step of pulling the stretching rod 28 out from the liquid container C and the suck-back step are performed together, even in the case where a larger headspace HS is required in the liquid container C, such headspace HS can be formed easily.

It is to be noted that pulling of the stretching rod 28 out from the liquid container C may be performed with the liquid container C kept in the upside-down posture or with the liquid container C put in the upright posture.

Figure 8:
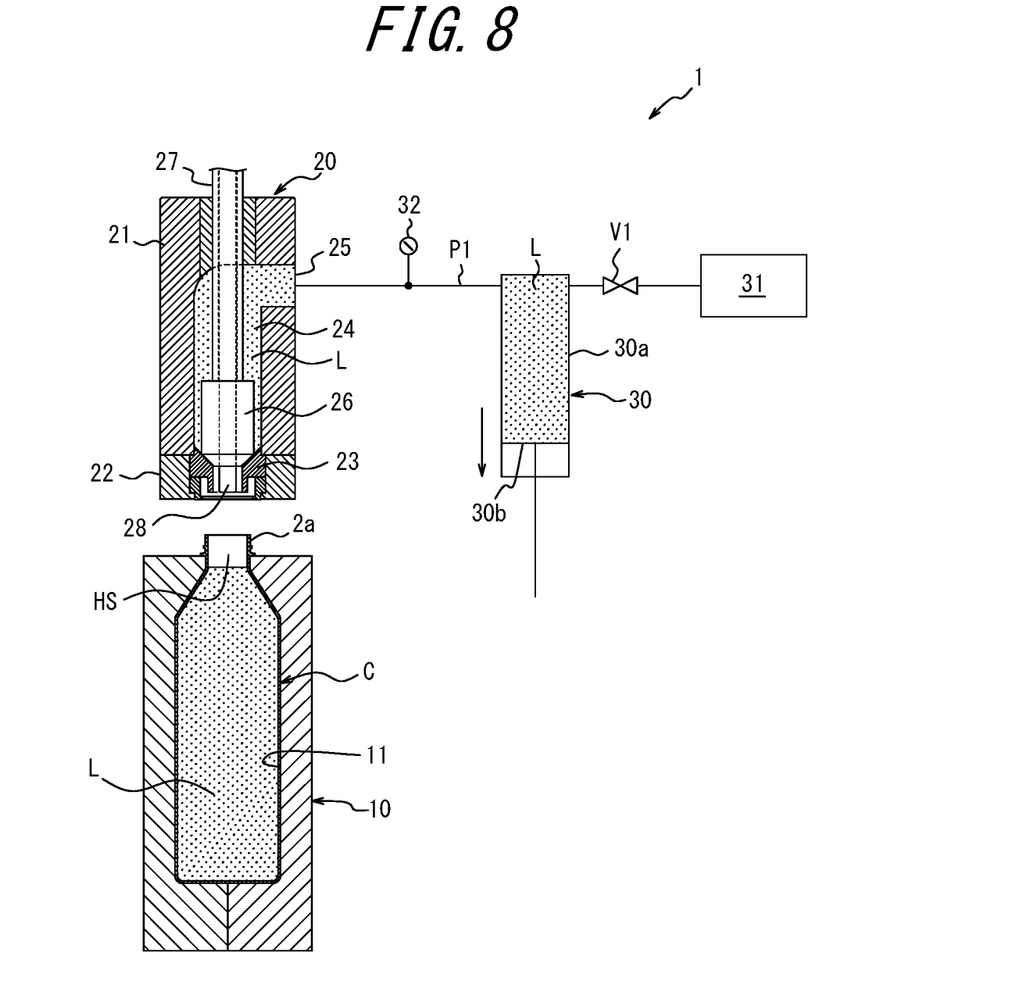
FIG. 8 is a diagram illustrating the liquid blow molding apparatus when a nozzle separation step is completed.

After the suck-back step, when the blow nozzle 23 is closed by the seal body 26 and the liquid container C is put back in the upright posture, next, the nozzle separation step is performed. In the nozzle separation step, as illustrated in FIG. 8, with the liquid container C kept in the upright posture, the nozzle unit 20 is relatively displaced in the direction separating from the mold 10 and the blow nozzle 23 is separated from the mouth portion 2a of the preform 2, and engagement of the blow nozzle 23 with the mouth portion 2a is released. When the blow nozzle 23 is separated from the mouth portion 2a of the liquid container C after molding, the liquid container C deformed due to volume reduction in the suck-back step is restored to its original shape, and a headspace HS of a predetermined amount is formed above the predetermined amount of liquid L inside the liquid container C.

Further, in the above described state, a cap is attached to the mouth portion 2a by a capping apparatus not illustrated, and subsequently the mold 10 is opened and a completed liquid container C is ejected from the mold 10. It is to be noted that a cap may be attached after the liquid container C is ejected from the mold 10.

As described above, in the liquid blow molding method according to this embodiment, the suck-back step is performed with the liquid container C molded in the molding step put in the upside-down posture. As a result, the liquid L near the mouth portion 2a of the liquid container C is prevented from containing a lot of air bubbles, and the amount of air bubbles contained in the liquid L sucked back from the inside of the liquid container C to the supply channel 24 in the suck-back step can be reduced. In this manner, the liquid L containing a lot of air bubbles is prevented from being supplied into the preform 2 in the following molding step. Thus, the amount and the pressure of the liquid L filled into the liquid container C after molding is stabilized, and the liquid container C can be molded precisely. In particular, when a container C having therein a large headspace HS, such as a liquid container C used for a container with a pump that contains a liquid L with a relatively high viscosity such as shampoo, liquid detergent and the like, a lot of liquid is sucked back to the supply channel 24 in the suck-back step. However, even in such case, the amount of air bubbles contained in the liquid L sucked back from the inside of the liquid container C to the supply channel 24 in the suck-back step is reduced sufficiently, and a liquid container C can be molded precisely.

In the liquid blow molding method according to this embodiment, an air-liquid replacement step of replacing the air inside the preform 2 with the liquid L can be performed before the molding step.

Figure 9:
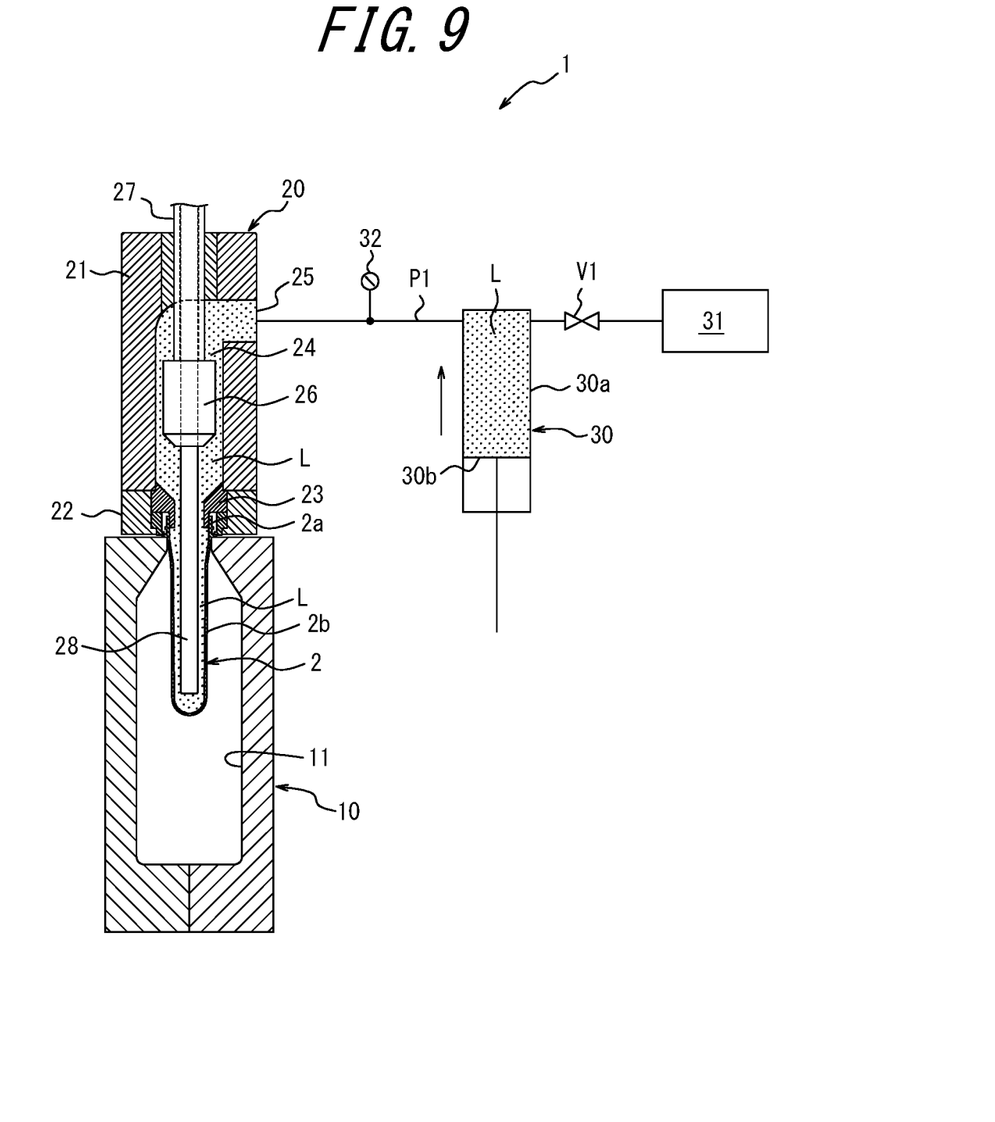
FIG. 9 is a diagram illustrating the liquid blow molding apparatus during an air-liquid replacement step.

As illustrated in FIG. 9, in the air-liquid replacement step, after the nozzle engagement step, the seal body 26 is opened with the opening-closing valve V1 kept closed and an air exhaust channel provided, separately from a supply port of the blow nozzle 23 for the liquid L, at the lower end of the blow nozzle 23 is opened. In that state the pump 30 is operated in the positive direction (pressurized direction) with an output smaller than that in the molding step. In this manner, the liquid L is supplied from the pump 30 into the preform 2 through the supply channel 24 and the blow nozzle 23 with a pressure that does not blow mold the preform 2. In this manner, the air inside the preform 2 is pushed out of the preform 2 by the liquid L supplied through the air exhaust channel, and inside the preform 2 is replaced with the liquid L.

In this manner, when the air-liquid replacement step is performed before the molding step, the amount of the air entrained in the liquid L supplied into the preform 2 in the molding step can be reduced, and as a result the amount of air bubbles contained in the liquid L sucked back from the inside of the liquid container C to the supply channel 24 in the suck-back step can be further reduced.

In particular, as in this embodiment, when the air-liquid replacement step is performed after the stretching rod 28 is displaced forward so that the tip thereof is located near the bottom of the body portion 2b of the preform 2 in the nozzle engagement step, the amount of the air to be replaced in the preform 2 can be reduced, and as a result the amount of the air entrained in the liquid L supplied into the preform 2 in the molding step can be further reduced.

Preferably, the air-liquid replacement step is performed with the preform 2 put in the upright posture. When the air-liquid replacement step is performed with the preform 2 put in the upright posture, the pressure of the liquid L can be easily adjusted by operating the pump 30, which enables an appropriate amount of liquid L to be supplied into the preform 2 without causing unnecessary deformation of the body portion 2b of the preform 2. In this manner, the amount of the air entrained in the liquid L supplied into the preform 2 in the molding step can be further reduced.

The air-liquid replacement step can also be performed with the preform 2 put in the upside-down posture. When the air-liquid replacement step is performed with the preform 2 put in the upside-down posture, the time required for the air not exhausted from the preform 2 to move to the bottom side of the preform 2 or of the liquid container C during the period from after the air-liquid replacement step to before the suck-back step can be prolonged. In this manner, the amount of the air bubbles contained in the liquid L sucked back from the inside of the liquid container C to the supply channel 24 in the suck-back step can be further reduced.

In this embodiment, the air-liquid replacement step is performed after the nozzle engagement step. However, before the blow nozzle 23 is engaged with the mouth portion 2a in a liquid-tight manner, that is, in a state where a predetermined gap is generated between the blow nozzle 23 and the mouth portion 2a, the pump 30 is operated in the positive direction with an output smaller than that in the molding step. In this manner, the liquid L can be supplied into the preform 2 while the air inside the preform 2 is exhausted outside from a gap between the blow nozzle 23 and mouth portion 2a. As a result, during the molding step, entrainment of the air into the liquid L supplied into the preform 2 is reduced, and generation of air bubbles in the liquid L sucked back into the supply channel 24 can be suppressed.

The present disclosure is not limited to the above described embodiment, and it is needless to say that various modifications may be made without departing from the spirit of the present disclosure.

For example, in the above described embodiment, the disclosed liquid blow molding method is performed by using the liquid blow molding apparatus 1 configured as illustrated in FIG. 1. However, the disclosed liquid blow molding method can also be performed by using a liquid blow molding apparatus and the like of other configurations.

Further, in the above described embodiment, although a head space HS is increased by performing a biaxial stretch blow molding by using the stretching rod 28 in the molding step and pulling the stretching rod 28 out from the liquid container C as well, a head space HS may not be formed by the stretching rod 28 (e.g., the stretching rod 28 may be pulled out during the period from the molding step to the nozzle separation step).

Furthermore, in the above described embodiment, although the molding step is performed with the preform 2 put in the upside-down posture, the molding step may be performed with the preform 2 put in the upright posture.

Moreover, in the above described embodiment, although the pump 30 is a plunger pump, it is not limited thereto, and pumps of various configurations may be used as long as the pump can supply a liquid L to the preform 2 by pressurizing the liquid L to a predetermined pressure and can suck back a predetermined amount of liquid L from a liquid container C after molding.

Furthermore, in the above described embodiment, although the liquid L in the liquid container C is sucked back to the supply channel 24 through the mouth portion 2a in the suck-back step, the liquid L in the liquid container C may be sucked back to the supply channel 24 through a channel provided to the stretching rod 28, after the blow nozzle 23 is closed by the seal body 26. In this case, when an opening of the channel of the stretching rod 28 is located near the mouth portion 2a, the liquid L containing less air bubbles can be sucked back.

Moreover, the disclosed liquid blow molding method can be applied not only to the case where a container needed to be provided therein with a large headspace HS, such as a liquid container C used for a container with a pump configured to contain a content liquid with a relatively high viscosity such as shampoo, liquid detergent, and the like, is molded, but also to the case where a variety of liquid containers C are molded regardless of the size of the headspace HS.

Furthermore, the timing when the liquid container C or the preform 2 is put in the upside-down posture is not limited to the period from after the nozzle engagement step to before the molding step as with the above described embodiment, as long as the suck-back step is performed with the liquid container C put in the upside-down posture while it is engaged with the blow nozzle 23, and can be changed in various manners.

REFERENCE SIGNS LIST

1 Liquid blow molding apparatus
2 Preform
2a Mouth portion
2b Body portion
10 Mold
11 Cavity
20 Nozzle unit
21 Main body block
22 Support block
23 Blow nozzle
24 Supply channel
25 Supply port
26 Seal body
27 Shaft body
28 Stretching rod
30 Pump
30a Cylinder
30b Piston
31 Supply tank
32 Pressure gauge
L Liquid
P1 Pipe
V1 Opening-closing valve
HS Headspace

The invention claimed is:

1. A liquid blow molding method of molding a liquid container containing a content liquid from a synthetic resin preform, the method comprising:
    a nozzle engagement step of engaging a blow nozzle connected to a pump through a supply channel with a mouth portion of the preform;
    a molding step of molding the preform into a container of a predetermined shape by supplying a liquid that is pressurized from the pump into the preform through the supply channel and the blow nozzle;
    a suck-back step of sucking back a predetermined amount of the liquid from an inside of the container to the supply channel by operating the pump in a reverse direction by putting the container molded in the molding step in an upside-down posture while the blow nozzle is engaged with the mouth portion;
    transition the container between the upside-down posture and an upright posture; and
    a nozzle separation step of separating the blow nozzle from the mouth portion with the container in the upright posture, after the suck-back step.

2. The liquid blow molding method according to claim 1, wherein the container is put in the upright posture after the blow nozzle is closed by a seal body in a state where the predetermined amount of liquid is sucked back from the inside of the container to the supply channel in the suck-back step, and the nozzle separation step is performed.

3. The liquid blow molding method according to claim 2, wherein
    the preform is stretched axially by a stretching rod in the molding step; and
    the stretching rod is pulled out from the container after the blow nozzle is closed by the seal body in the nozzle separation step.

4. The liquid blow molding method according to claim 1, wherein, before the molding step, an air-liquid replacement step is performed in which the air in the preform is replaced with a liquid by supplying a liquid into the preform at a pressure of a degree that does not blow mold the preform.

5. The liquid blow molding method according to claim 4, wherein the air-liquid replacement step is performed with the preform put in the upright posture.

6. The liquid blow molding method according to claim 1, wherein
    the molding step is performed with the preform put in the upside-down posture to mold the container in the upside-down posture; and
    the suck-back step is performed with the container kept in the upside-down posture, after the molding step.

7. The liquid blow molding method according to claim 2, wherein, before the molding step, an air-liquid replacement step is performed in which the air in the preform is replaced with a liquid by supplying a liquid into the preform at a pressure of a degree that does not blow mold the preform.

8. The liquid blow molding method according to claim 3, wherein, before the molding step, an air-liquid replacement step is performed in which the air in the preform is replaced with a liquid by supplying a liquid into the preform at a pressure of a degree that does not blow mold the preform.

9. The liquid blow molding method according to claim 7, wherein the air-liquid replacement step is performed with the preform put in the upright posture.

10. The liquid blow molding method according to claim 8, wherein the air-liquid replacement step is performed with the preform put in the upright posture.

11. The liquid blow molding method according to claim 2, wherein
    the molding step is performed with the preform put in the upside-down posture to mold the container in the upside-down posture; and
    the suck-back step is performed with the container kept in the upside-down posture, after the molding step.

12. The liquid blow molding method according to claim 3, wherein
    the molding step is performed with the preform put in the upside-down posture to mold the container in the upside-down posture; and
    the suck-back step is performed with the container kept in the upside-down posture, after the molding step.

13. The liquid blow molding method according to claim 4, wherein
   the molding step is performed with the preform put in the upside-down posture to mold the container in the upside-down posture; and
   the suck-back step is performed with the container kept in the upside-down posture, after the molding step.

14. The liquid blow molding method according to claim 7, wherein
   the molding step is performed with the preform put in the upside-down posture to mold the container in the upside-down posture; and
   the suck-back step is performed with the container kept in the upside-down posture, after the molding step.

15. The liquid blow molding method according to claim 8, wherein
   the molding step is performed with the preform put in the upside-down posture to mold the container in the upside-down posture; and
   the suck-back step is performed with the container kept in the upside-down posture, after the molding step.

16. The liquid blow molding method according to claim 5, wherein
   the molding step is performed with the preform put in the upside-down posture to mold the container in the upside-down posture; and
   the suck-back step is performed with the container kept in the upside-down posture, after the molding step.

17. The liquid blow molding method according to claim 9, wherein
   the molding step is performed with the preform put in the upside-down posture to mold the container in the upside-down posture; and
   the suck-back step is performed with the container kept in the upside-down posture, after the molding step.

18. The liquid blow molding method according to claim 10, wherein
   the molding step is performed with the preform put in the upside-down posture to mold the container in the upside-down posture; and
   the suck-back step is performed with the container kept in the upside-down posture, after the molding step.

\* \* \* \* \*